June 28, 1938. J. S. OLES 2,121,819
VIBRATION DAMPER
Original Filed Jan. 22, 1934   3 Sheets-Sheet 1
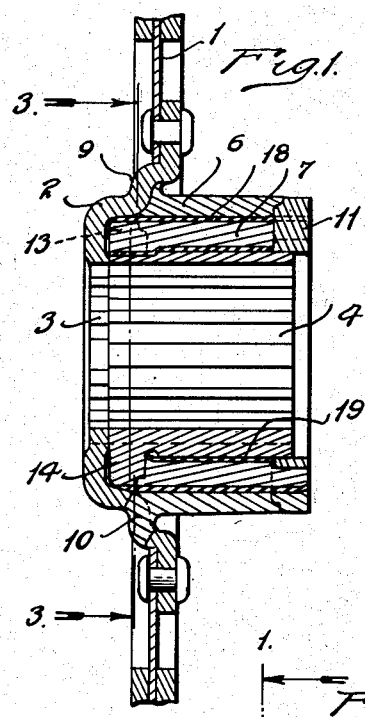
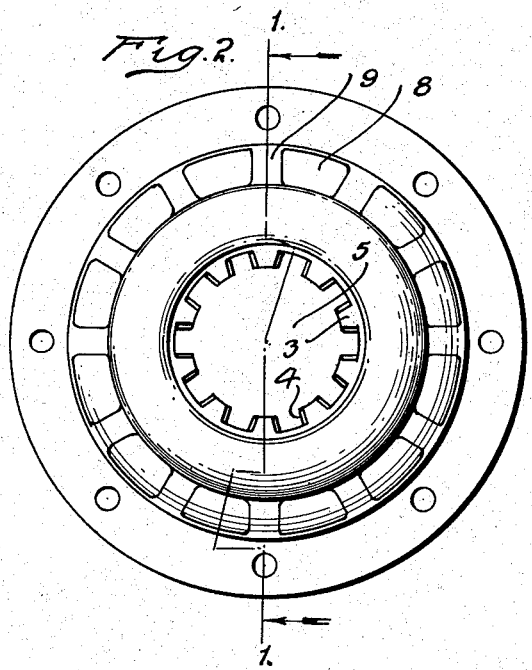
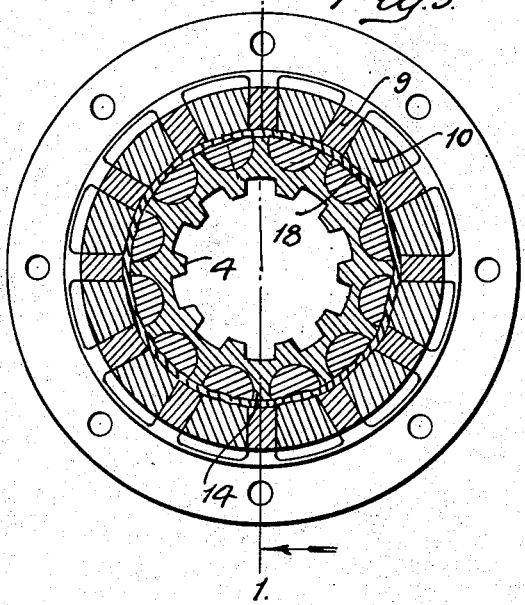
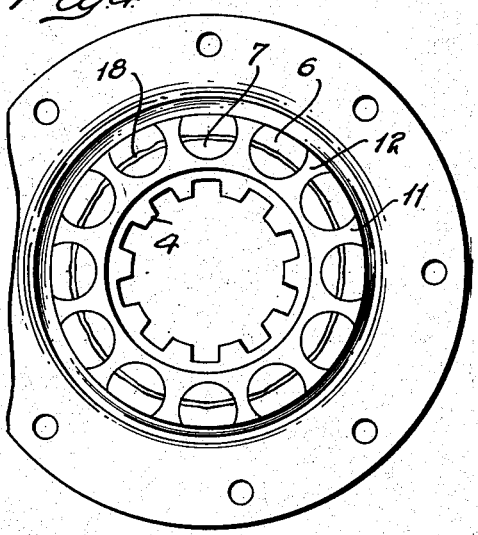
INVENTOR.
JOHN S. OLES.
BY
Barnes, Kisselle & Laughlin
ATTORNEYS.

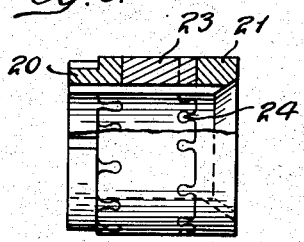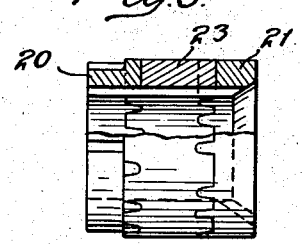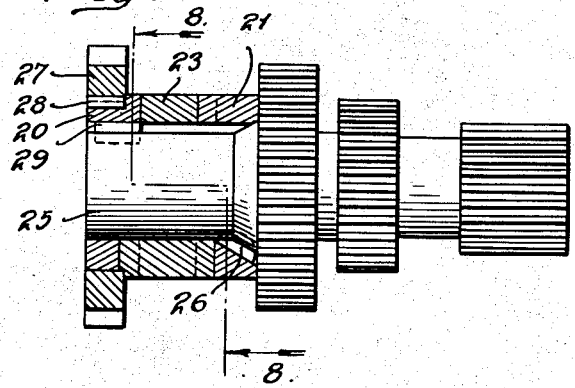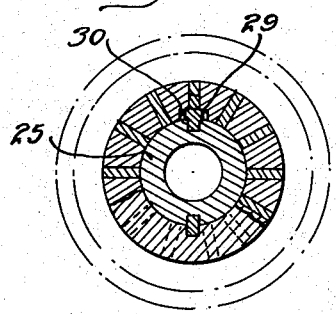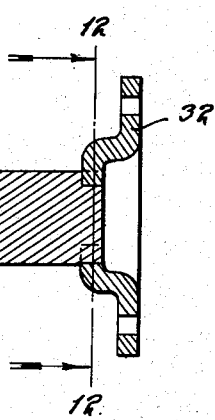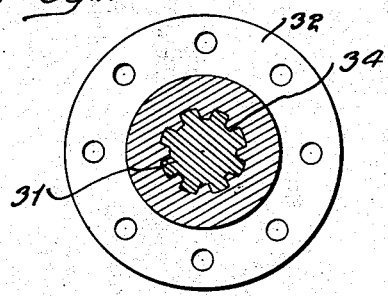

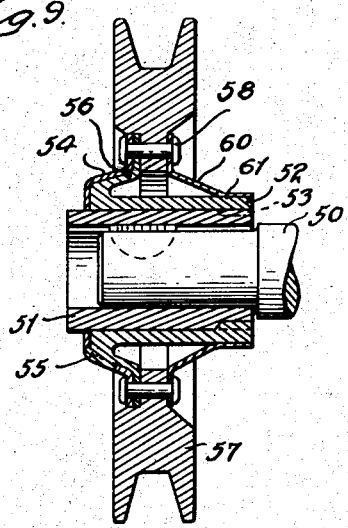
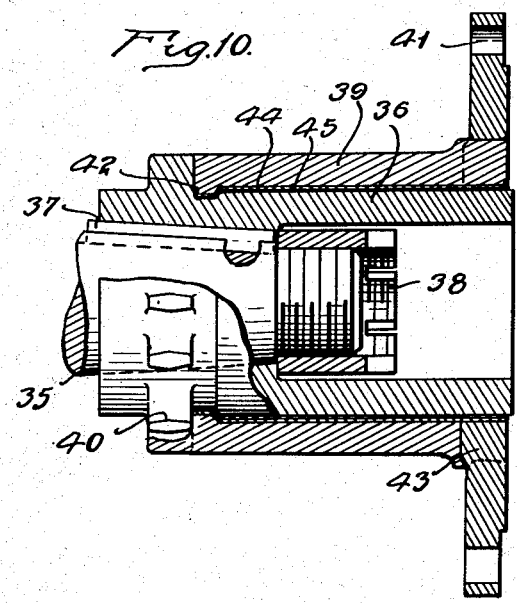
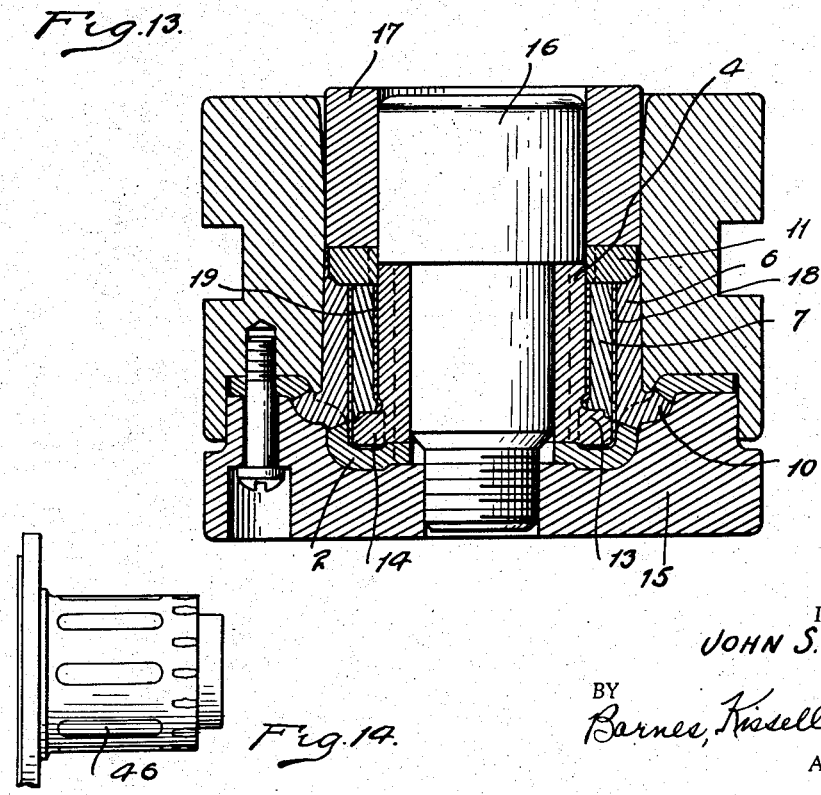

Patented June 28, 1938

2,121,819

UNITED STATES PATENT OFFICE 2,121,819

VIBRATION DAMPER

John S. Oles, Detroit, Mich.

Application January 22, 1934, Serial No. 707,779
Renewed June 1, 1936

19 Claims. (Cl. 64—27)

This invention has to do with a vibration damping device.

The invention aims to provide a vibration damping device in which the damping action is performed by an element which can be readily associated with other machine elements or parts and which is capable of transmitting driving torque so that the element may be placed in a power transmitting line. However, the damping element need not necessarily be disposed in a transmitting line but may be associated, for example, with a rotary element in the form of a weighted wheel or flywheel type device which transmits no power to other machine elements or with a stationary element and parts having an oscillating or angular motion.

To this end the invention contemplates a vibration damping element in which the flexibility or yieldability thereof can be varied so that it has the proper vibration frequency and which advantageously has the properties of hysteresis or energy absorbing qualities. More specifically, the damping element comprises moldable non-metallic material such as a phenolic condensation product. Preferably, a fibrous body is employed such as a woven fabric of cotton, linen, hemp or the like or chopped or shredded fibrous material, or material of powder form impregnated with a hardened binder such as a phenolic condensation product. A body of metal cloth such as a screening material or woven strands of steel, copper or the like may be used.

Fig. 1 is a cross-sectional view showing a damper as it may be associated with the hub of a clutch.

Fig. 2 is a front elevational view thereof.

Fig. 3 is a sectional view taken substantially on line 3—3 of Fig. 1.

Fig. 4 is an end elevation taken from the opposite end of Fig. 2.

Fig. 5 is a view illustrating how a damping element may be united with two machine elements, the view being partly in section.

Fig. 6 is a view similar to Fig. 5 showing another manner of associating the damping element with machine elements.

Fig. 7 is illustrative of how the damping element may be embodied in a transmission shaft.

Fig. 8 is a sectional view taken on line 8—8 of Fig. 7.

Fig. 9 is a view illustrating a structure where the element is incorporated in the hub of a belt pulley.

Fig. 10 is a view illustrating how the element may be associated in the propelling shaft of a vehicle.

Fig. 11 is a sectional view showing a modified form of damping element.

Fig. 12 is a modified view taken substantially on line 12—12 of Fig. 11.

Fig. 13 is a sectional view taken through a mold illustrating how the vibration damping element may be associated with parts such as shown in Fig. 1.

Fig. 14 is a view showing a form of the invention.

The element for damping the vibrations may be built up of layers of woven fabric such as cotton duck, linen, or the like impregnated with phenolic resin. This may then, by a process known to those skilled in the art, be subjected to heat and pressure as in a mold, to shape the element and to permanently form it into a body, thereafter resistant to change of form. At the time the element is subjected to the heat and pressure process to finally shape and form it, it may be molded directly to a machine element or elements with which it is to be used. The resilient or flexible property of the phenolic condensation element is employed for damping purposes.

Referring now to Fig. 1 the driven disc of a clutch is shown at 1 and the hub therefor includes the phenolic condensation product through which power is transmitted and the qualities of which provide for damping vibrations. The disc 1 may be fastened directly to a plate 2 advantageously having an internal spline formation 3 the purpose of which will later appear. A splined hub piece 4 is designed to fit over and in driving relation with the splined shaft 5. The vibration damping element in this case is connected to the plate 2 and the hub 4. However, in the case of a clutch disc hub, space is limited, so in order to obtain a damping element of requisite strength, yet which may have the necessary yieldability and vibration period, a novel element structure is employed. There is a tube 6 of a phenolic condensation product and another tube 7 of the same material telescoped within the first. The plate 2 is formed so that one end of the tube 6 may be locked thereto in driving relation, and to this end, the plate may have a series of apertures 8 separated by bars 9 and it might here be said that the bars are preferably arranged to have fairly well rounded edges to prevent the starting of fatigue cracks in the damping element due to localized stresses. One end of the tube 6 is formed to have parts 10 extending into the several apertures and locking in driving relation with the cross bars 9. This structure may be accomplished in different ways as will presently appear. The opposite end of the tube 6 is joined to the adjacent end of the tube 7. For this purpose a ring element 11 may be employed having radial projections 12 interlocking to the adjacent ends of the tubes. The ring element 11 may telescope over one end of the hub part 4 as shown. The opposite end of the tube 7 is locked to the element 4 for which purpose the element 4 has radially extending projections or teeth 13. Accordingly, it will be observed that the driving action of the disc 1 is transferred into one end of the tube 6, through that tube into tube 7, and through the tube 7 to the hub element 4 which is in turn keyed to the shaft 5. This structure in effect obtains a vibration damping element, the effective length of which is approximately twice that of the overall actual length.

The tubes of the phenolic condensation product may be molded so as to be fitted to the interlocking metallic parts. In other words, the tube 6 may come out of a mold with alternating projections and recesses on opposite ends for fitting the plate 9 and the ring 11; likewise the tube 7 may be molded with alternating recesses and projections for fitting the ring 11 and projections 13. Fig. 6 illustrates this where the metallic rings 20 and 21 are constructed with axial projections for fitting into a similar formation in a ring of phenolic condensation material as illustrated at 23. On the other hand, as illustrated in Fig. 5, the vibration damping element 23 may be molded directly to the rings 20 and 21 and in this case the interfitting projections and recesses may have reentrant curves as shown at 24, thus holding the parts against axial separation.

Fig. 13 illustrates how the parts shown in Fig. 1 may be molded together. Here it will be observed that the plate 2 is placed in the mold 15 together with the hub part 4 located around a center piece 16. The rings 6 and 7 in unfinished form comprising the fibrous material impregnated with phenolic resin may then be placed in the mold over which the ring 11 may be disposed. Then pressure may be applied by the plunger 17 and heat may be applied to the end that the sleeves 6 and 7 are formed and at the same time fashioned to tie into the apertures in the plate 2 and in and around the projections on the hub part 4 and the ring 11. This provides for an exceptionally secure and tight joint between the damping sleeves and the other elements in which there is no lost play or looseness.

However, some expedient must be resorted to to keep the telescoping sleeves from becoming bound to each other. For this purpose, a separating medium 18 is placed between the sleeves before they are formed with heat and pressure. This separating medium is preferably one which will not absorb the phenolic resin readily to become united to the sleeves and it has been found that a fairly thin tube or strip of rubber may be advantageously employed. Similarly it may be desirable to prevent the inner ring 7 from binding against the hub piece 4 in such a manner as would interfere with the relative movement required for vibration damping, and a rubber separator 19 may be employed between the inner ring 7 and the hub element 4. As is illustrated in Figs. 1 and 13 the hub element 4 may have one or more depressions or circumferential grooves 14 into which the material of the ring 7 may be forced to tie the parts together against axial separation. Friction material such as, brake lining material or clutch facing material, or other suitable composition material may be used between a telescoping sleeve of phenolic resin and a metallic element, or between two sleeves of phenolic resin in order to effect a friction action upon relative movement between the telescoping parts. Such friction material may be used with or without the insulating material and in Fig. 10 such a friction material is shown.

In making up a damping element it is preferable that it be tuned so as to properly dampen the vibration which it is to encounter in a particular installation. Various factors enter into this tuning as, for example, the effective length of the damping element, the thickness of the material which, in the case of a structure such as shown in Fig. 1, is the thickness of the sleeves, the diameter of the element, and the general strength of the element as may be determined in part by the fibrous material used, as for example, there is a difference between using cotton duck and linen. These features may be determined and the elements molded to proper size, etc., to give the desired frequency. As heretofore mentioned where there is shortage of space the frequency may be lowered by employing the telescoping sleeves just described.

In the form shown in Fig. 1 the vibrations result in torque transmitted through the sleeves which causes a twisting of the sleeves and yielding or flexing thereof. A phenolic condensation product as above described is well adapted for damping these vibrations due to its energy absorbing qualities. It is believed that when such a vibration damping element is flexed that the reaction to this flex or strain is not sudden or violent, but is of the energy absorbing type, rather in the nature of a lag or delay in the material returning to its normal condition due probably to the quantity of hysteresis. Accordingly, such a vibration damper may be used without resort to an outside friction or braking means controlling the yielding action. However, it is within the invention to employ a separate friction means if the same be desired. A limit stop structure may be used to prevent undue distortion of the damping element and/or to effect a driving action in the event of failure of the damping element. In the structure shown in Figs. 1 and 2 this is accomplished by the spline formation 3 on the plate 2, the teeth of which fit loosely in the splined shaft 5 as shown in Fig. 2. This provides for relative movement between the plate 2 and the shaft 5 but limits the same and effects a positive drive when, and if, necessary. Fig. 4 shows the line of demarcation between the tubes 6 and 7, this being illustrated by the dividing element 18 and it will be observed that this line is rather uneven as shown, this being the result of forming the sleeves directly to the ring 11 as illustrated in Fig. 13.

Several other modified forms and various adaptations of the invention are shown in the remaining figures. Fig. 7 shows the shaft of a transmission wherein the structure of either Figure 5 or 6 may be used. In this figure the shaft 25 formed with several gears, as shown, is keyed to the ring 21 as at 26. A gear 27 is keyed as at 28 to the ring 20. Thus the gear 27 may transmit motion to the shaft through the element 23. A key 29 may connect the shaft 25 and ring 20 through the means of an oversized keyway 30 to provide the limit stop. Figs. 11 and 12 show a vibration damping element of a phenolic condensation product in the form of a rod 31 as distinguished from a sleeve. This may be connected in any suitable manner at opposite ends to elements such as plates 32 and 33 by fitting or forming the rod into driving relations with internal teeth 34.

Fig. 10 shows an arrangement wherein the damping element is arranged in the propeller shaft line for a vehicle. The driving shaft is shown at 35 to which a sleeve 36 may be keyed as at 37 and held in position by a nut 38, and the damping element 39 may be formed directly on the sleeve 36 tying into teeth 40. A flange with apertures 41 for connecting to a propeller shaft or some part thereof such as a universal joint may be interlocked with the element 39 as at 43. The element 39 may be formed into a recess or groove 42 to resist axial separation. A layer of insulating material 44 may be used in this structure or with any other single tube damper such as the Fig. 9 structure. Friction material 45 may also be used to exert a controlling friction action to relative movement.

Fig. 9 discloses a structure wherein the vibration damping element is mounted in the hub of a pulley which may be the usual fan belt pulley on the front of an engine in an automotive vehicle. The shaft is shown at 50 keyed to which is a hub piece 51. A sleeve of phenolic condensation product 52 is locked in driving relation with the hub piece at one end thereof by interengaging with projections 53. The opposite end of the sleeve 52 is in driving relation with plate 54 by fitting into apertures 55 therein. The sleeve may have a radially projecting flange like part 56 which may be connected to a pulley 57 by rivets 58 and to reinforce the flange the plate 54 may follow the shape thereof and it may be secured to the pulley by the rivets 58. The yielding action of the sleeve 52 results in relative movement between the shaft and the pulley. The belt which operates over the pulley sets up a strain on the part 56, inasmuch as the pulley is not centered thereon and an outboard support 60 which may be in the form of a sheet metal stamping may be fastened to the pulley by the rivets, on the opposite side of the pulley from the flange 56, and it may have a bearing portion 61 formed by an axially extending part arranged to fit over the damping sleeve. Advantageously the bearing 61 may fit snugly on the sleeve so that the bearing portion 61 and the portion of the sleeve therein move relative to each other upon flexing of the damping element, and the resultant friction may be arranged to more or less control the flexing action. This structure may also be used to exemplify a structure where a free running weighted wheel or flywheel type of device is used for damping vibrations. Such a structure may be readily visualized by removing the fan belt and in fact such a structure is shown in Fig. 9. This structure may also be used to exemplify a structure where power is transmitted to an aerial propeller or a marine screw propeller; the propeller in either case being assembled in place of the weighted wheel 57.

The structure shown in Fig. 14 is similar to Fig. 10 and it shows a damping element slotted as at 46 to increase its flexibility. Such a slotted structure may be used in any form of damping element where it is desirable or necessary to increase its flexibility.

In some of the claims where the word fabric or fibrous is used, such word or words are to be construed to cover metal cloth, screen or the like.

I claim:

1. A vibration damper construction comprising a hub member, a plate member, telescoping sleeves each of a phenolic condensation product, one end of one sleeve being connected in driving relation with the plate and the adjacent end of the other sleeve being connected in driving relation with the hub element, and means interconnecting the opposite ends of the sleeves.

2. A vibration damper construction comprising a hub member, a plate member, telescoping sleeves each of a phenolic condensation product, one end of one sleeve being connected in driving relation with the plate and the adjacent end of the other sleeve being connected in driving relation with the hub element, means interconnecting the opposite ends of the sleeves, and insulating means disposed between the sleeves.

3. A vibration damper construction comprising a hub member, a plate member, telescoping sleeves each of a phenolic condensation product, one end of one sleeve being connected in driving relation with the plate and the adjacent end of the other sleeve being connected in driving relation with the hub element, means interconnecting the opposite ends of the sleeves, a layer of insulating material substantially non-absorbent to phenolic resin disposed between the sleeves, and a layer of insulating material substantially non-absorbent to phenolic resin disposed between the inner of said sleeves and the hub element.

4. A vibration damping structure comprising a hub element, another element for transmitting motion to the hub element, a sleeve of a phenolic condensation product telescoped over the hub, another sleeve of a phenolic condensation product telescoped over the first mentioned sleeve, connecting means for adjacent ends of the sleeves, said sleeves being molded to the hub element, the other element, and the connecting means, with two adjacent ends of the sleeves molded to the connecting means and the other ends of the sleeves molded respectively to the hub element and the other element for establishing driving connections.

5. A vibration damping structure comprising a hub element, another element for transmitting motion to the hub element, a sleeve of a phenolic condensation product telescoped over the hub, another sleeve of a phenolic condensation product telescoped over the first mentioned sleeve, connecting means for adjacent ends of the sleeves, said sleeves being molded to the hub element, the other element, and the connecting means, with two adjacent ends of the sleeves molded to the connecting means and the other ends of the sleeves molded respectively to the hub element and the other element for establishing driving connections, and a rubber insulating layer between the sleeves.

6. A vibration damping structure comprising a hub element, another element for transmitting motion to the hub element, a sleeve of a phenolic condensation product telescoped over the hub, another sleeve of a phenolic condensation product telescoped over the first mentioned sleeve, connecting means for adjacent ends of the sleeves, said sleeves being molded to the hub element, the other element, and the connecting means, with two adjacent ends of the sleeves molded to the connecting means and the other ends of the sleeves molded respectively to the hub element and the other element for establishing driving connections, and a rubber insulating layer between the sleeves, and a rubber insulating layer between the hub element and the sleeve next adjacent thereto.

7. A vibration damper construction comprising in combination a driving member, a driven member, telescoping sleeves each of a phenolic condensation product, one end of one of the telescoping sleeves being connected to the driving member, one end of another of the telescoping sleeves being connected to the driven member, and means interconnecting opposite ends of the telescoping sleeves.

8. A vibration damper construction comprising in combination a driving member, a driven member, telescoping sleeves each of a phenolic condensation product, one end of one of the telescoping sleeves being connected to the driving member, one end of another of the telescoping sleeves being connected to the driven member, means interconnecting opposite ends of the telescoping sleeves, and insulating material substantially non-absorbent to phenolic resin disposed between the telescoping sleeves.

9. A vibration damper construction comprising a driving member, a driven member, a pair of telescoping sleeves each of a phenolic condensation product, one end of one sleeve being connected to the driving member, the adjacent end of the other sleeve being connected to the driven member, and means interconnecting the opposite ends of the sleeves.

10. A vibration damper construction comprising a driving member, a driven member, a pair of telescoping sleeves each of a phenolic condensation product, one end of one sleeve being connected to the driving member, the adjacent end of the other sleeve being connected to the driven member, means interconnecting the opposite ends of the sleeves, and insulating material between the sleeves substantially non-absorbent to phenolic resin.

11. In a torque transmitting vibration dampening structure the combination of a rotary driving means, a rotary driven means, a tubular member comprising a body of woven fibrous material united into an integral definitely shaped form by a phenolic condensation product and having one end permanently mold connected in driving relation with recesses in the driving means and the other end permanently mold connected in driving relation with recesses in the driven means, said body having an axial extent between its connected ends such that it will dampen torsional vibrations, and having sufficient torque transmitting strength to transmit driving force from the driving means to the driven means.

12. In a torque transmitting vibration damping structure, the combination of a rotary driving member having recesses, a rotary driven member having recesses, and a third member concentrically disposed relative to the axes of the driving and driven members and comprising a body of woven fibrous material united into an integral definitely shaped form by a phenolic condensation product, and having one end molded into the recesses in the driving member and the other end molded into the recesses in the driven member, said third member having an axial extent between its connected ends such that it will dampen torsional vibrations and having sufficient torque transmitting strength to transmit driving force from the driving member to the driven member.

13. In a torque transmitting vibration damping structure, the combination of a rotary driving member, a rotary driven member, a tubular member comprising a body of phenolic condensation product having one end molded in driving relation with the driving member and the other end molded in driving relation with the driven member, said tubular member having an axial extent between its connected ends such that it will dampen torsional vibrations, and having sufficient torque transmitting strength to transmit driving force from the driving member to the driven member the mold connection with at least one of the first two mentioned members comprising recesses in said one member into which integral portions of the tubular member are molded.

14. In a torque transmitting vibration damping structure, the combination of a rotary driving member having recesses, a rotary driven member having recesses, a third member positioned concentrically relative to the axes of the driving and driven members and comprising a body of phenolic condensation product and having one end permanently molded in the recesses and in driving relation with the driving member and the other end permanently molded in the recesses and in driving relation with the driven member the molded connections being such as to resist axial separation, said body having an axial extent between its connected ends such that it will dampen torsional vibrations, and having sufficient torque transmitting strength to transmit driving force from the driving member to the driven member.

15. In a torque transmitting vibration dampening structure, the combination of a driving member, a driven member, one of said members having a part which is shaft-like in form, a third member comprising a body of woven fibrous material united into an integral definitely shaped form by a phenolic condensation product, said member being of tubular form and surrounding said shaft-like part, said third member being connected at its opposite ends in driving relation with the driving and driven members and having sufficient torque transmitting strength to transmit the driving force and an axial extent to provide a torsion set up by vibrations to dampen the same, and a layer of insulating material between the third member and said shaft-like part serving to separate and insulate the shaft-like part from said third member.

16. In a torque transmitting vibration dampening structure, the combination of a driving member, a driven member, one of said members having a part which is shaft-like in form, a third member comprising a body of woven fibrous material united into integral definitely shaped form by a phenolic condensation product, said member being of tubular form and surrounding said shaft-like part, said third member being connected at its opposite ends in driving relation with the driving and driven members and having sufficient torque transmitting strength to transmit the driving force and an axial extent such that it will dampen torsional vibrations, and a layer of rubber between the third member and said shaft-like part serving to separate and insulate the shaft-like part from said third member.

17. In a torque transmitting vibration dampening structure, the combination of a rotary driving member, a rotary driven member, a tubular member comprising a body of fibrous material united into an integral definitely shaped form by a phenolic condensation product, at least one of the first two mentioned members having recesses, the tubular member having one end connected in driving relation with one of the first mentioned members and its other end molded into the recesses of the other of said first mentioned members to provide a permanent driving connection which resists axial separation, said tubular member having an axial extent between its connected ends such that it will dampen torsional vibrations and having sufficient torque transmitting strength to transmit driving force from the driving member to the driven member.

18. A vibration damper construction comprising, a driving member, a driven member, a pair of telescoping sleeves comprising fibrous material united into an integral definitely shaped sleeve form by a binder formed and set by heat and pressure, one end of one sleeve being connected to the driving member, the adjacent end of the other sleeve being connected to the driven member, and means interconnecting the opposite ends of the sleeves.

19. In a torque transmitting vibration dampening structure, the combination of a rotary driving means, a rotary driven means, a tubular member comprising a body of fibrous material united into an integral definitely shaped form by a binder formed and set by heat and pressure and having one end permanently mold-connected in driving relation with the driving means and the other end permanently mold-connected in driving relation with the driven means, said body having an axial extent between its connected ends such that it will dampen torsional vibrations, and having sufficient torque transmitting strength to transmit driving force from the driving means to the driven means.

JOHN S. OLES.